F. W. POWERS.
WATER MIXER.
APPLICATION FILED JUNE 13, 1919.
1,423,880.
Patented July 25, 1922.
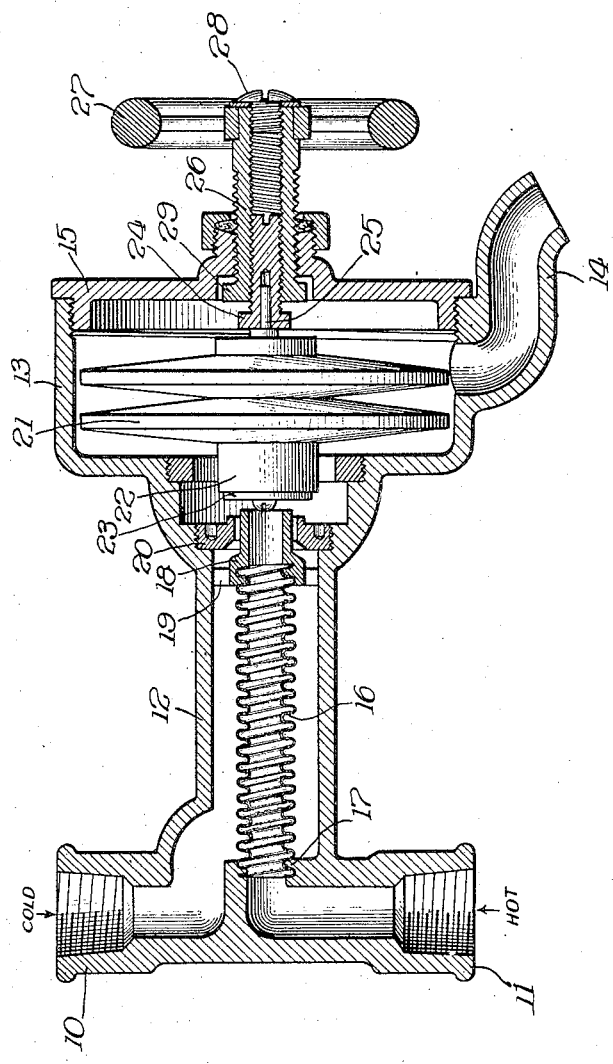
Witness:
A. J. Sauser.
Inventor:
Fred W. Powers
By Chas. F. Thomas
Atty.

UNITED STATES PATENT OFFICE.

FRED W. POWERS, OF CHICAGO, ILLINOIS, ASSIGNOR TO THE POWERS REGULATOR COMPANY, OF CHICAGO, ILLINOIS, A CORPORATION OF ILLINOIS.

WATER MIXER.

1,423,880.  Specification of Letters Patent.  Patented July 25, 1922.

Application filed June 13, 1919. Serial No. 303,871.

*To all whom it may concern:*

Be it known that I, FRED W. POWERS, a citizen of the United States, and resident of Chicago, in the county of Cook and State of Illinois, have invented certain new and useful Improvements in a Water Mixer, of which the following is a specification.

My invention relates to thermostatic water controllers and particularly to a device for combining cold water and hot fluids and automatically controlling the discharge temperature thereof.

One of the principal objects of the invention is to provide a device of the class described, adapted for use in connection with wash basins, individual shower heads and other devices where the delivery is not so greatly restricted as to bring a very considerable water pressure to bear upon the external surfaces of the thermostatic controlling discs. In the device here under consideration I provide an enclosed valve which is secured to a pair of discs containing a heat expansible fluid, the valve being arranged to sequentially contact a pair of seats which surround the hot and cold fluid inlets, one seat being movable in such manner that it may first be closed and then moved with the valve to a position in which the other inlet is closed.

A further object is to so arrange the parts that the thermostat and valve are bodily moved toward their extreme positions and to include means whereby a fixed adjustment is secured to limit the extent of opening movement and thereby the high temperature limit of the discharged fluid.

The invention will be more readily understood by reference to the accompanying drawing, in which the figure is a longitudinal sectional view through a controller constructed in accordance with my invention.

In the drawings it will be seen that I provide a casing having nipples 10, 11, to which the cold and hot water supply pipes respectively are connected. These nipples join in a conduit 12, which terminates in an enlarged head 13, having a spout or outlet 14, and which is closed by a screw-cap 15, in the usual manner. Arranged internally of the conduit 12, is a longitudinally expansible and contractible conduit 16, which may be of relatively thin, corrugated material, having a capacity for telescoping under pressure applied to the free end thereof. The inner end of this tube may be anchored as at 17, while the outer end has secured thereto a seat member 18, provided with guide lugs 19, thereon. This seat member is centered within a second seat member 20, which is threaded and secured in place as shown. The cold water emerges into the thermostat casing around the seat member 18, while the hot water emerges through the seat member 18.

The thermostat may be composed of one or more discs 21, of well known form and containing a heat expansible fluid. A valve member 22, having a washer 23, on the face thereof, is fixed to and movable with the disc members, the washer being adapted, because of the normal position of the seat member 18, first to contact that member and by exerting longitudinal pressure thereon to telescope the tube 16, and close the hot water inlet, and thereafter to contact the seat member 20, and close the cold water inlet. At the opposite side the disc members bear against a screw-threaded plug 24, by means of a pin 25, which is revolubly mounted within the plug. The plug 24, is intended as a more or less permanent adjustment and is mounted within a threaded aperture within the stem 26, which is in turn threaded within the cap 15. The stem 26 terminates in a hand-wheel 27, or other suitable manual means for operation. The outside opening to the threaded central aperture in the stem 26, is closed by a screw 28.

It will be noted that the stem 26, is provided with a head 29, which serves to limit the outward movement thereof, and by suitably adjusting the screw-member 24, a high temperature limit may be determined at which water may be delivered.

The device herein illustrated is intended to automatically control the admission of the hot water, the cold water control being manual. In the position shown in the drawings hot and cold fluids will be delivered to the full capacity of the parts. If there is any increase in the temperature or pressure of the hot water the thermostat will automatically compensate therefor as the valve member will be moved to restrict the hot water inlet by the expansion of the discs 21, and the water will be delivered at a uniform temperature. Should the user desire to lower the temperature of the delivered water, assuming that the temperature and pressure of the hot water remains constant, he may do so by turning the hand-wheel 27, to the right, thus bodily moving the discs 21, and valve member 22, to the left, as viewed in the drawing, thus restricting the outlet for the hot water. In whatever position the discs are thus placed, the automatic control of the delivered fluid will continue, assuming that the supply of hot water is not interrupted. If the manual movement of the discs and valve is continued, the hot water supply will be completely shut off and cold water only will be delivered. Still further movement of the hand wheel will result in longitudinally contracting the tube 16, and finally shutting off the cold water. It will be understood that in the construction shown there is sufficient resiliency in the tube 16, to cause the return of the seat member to the position of the drawings when the parts are moved to the position shown in the drawings.

If the cold water supply be suddenly interrupted so that hot water only contacts with the discs, they will respond immediately by expanding and shutting off this flow of hot water, this operation being almost instantaneous and therefore a protection against scalding. The movement of the valve itself being thermostatic, it automatically compensates for variations which may occur in the pressure or temperature of the supplies with the result that the delivery is uniform.

It will be observed also that in opening this faucet or valve its construction is such that cold water must first be admitted and the operator cannot therefore subject himself to danger of scalding as in the case where he has an optional control of both hot and cold water supplied.

The thermostatic liquid selected for use within the discs will depend upon the desired delivery temperature. For ordinary use ether may be used satisfactorily. It will be understood that the tube 16, may be constructed in a different manner from that shown and modifications such as will readily suggest themselves to others may be made in the form of the valve and in its relation to the two seats, in order to accomplish the same results. Such modifications are considered to be within the scope of my invention.

I claim:

1. In a tempered fluid controller, the combination of a casing having hot and cold fluid inlets and a temepered fluid outlet, a thermostat, a valve controlled thereby, and a pair of valve seats normally disposed in differently spaced relation to said valve, one of said seats being movable by the action of the thermostat to a position in which the valve is in contact with both seats, substantially as described.

2. In a tempered fluid controller, the combination of a casing having hot and cold fluid inlets and a tempered fluid outlet, a thermostat, a valve controlled thereby, a pair of concentric valve seats which surround the hot and cold fluid inlets, and means operable by the movement of the thermostat for sequentially bringing the valve into contact with said seats, substantially as described.

3. In a tempered fluid controller, the combination of a casing having hot and cold fluid inlets and a tempered fluid outlet, a thermostat within the casing, a valve controlled thereby, a pair of valve seats, one of said seats being movable relative to the other, the parts being arranged whereby the seats are sequentially brought into contact with the valve under the action of the thermostat, substantially as described.

4. In a device of the class described, the combinatin of a casing having a pair of concentrically arranged conduits which terminate in seats, means associated with one of said conduits permitting the telescoping thereof and the movement of the seat at the terminal portion thereof into line with the rigid seat, a thermostat, and a valve carried by the thermostat adapted to co-operate with both of said seats, substantially as described.

5. In a device of the class described, the combination of a casing providing hot and cold fluid inlets and a tempered fluid outlet, one of said inlets being in the form of a telescoping tube arranged internally of the other inlet, the terminal portion of the collapsible tube providing a valve seat, a thermostat, and a valve carried thereby, the valve being arranged to first contact the seat at the end of the telescoping tube, and thereafter to close the other inlet, substantially as described.

6. In a fluid controller, the combination of a casing having a rigid inlet tube and a telescopic tube arranged within the rigid tube, seats at the terminal points of the rigid and telescopic tubes, a thermostat within the casing, and a valve member carried by the thermostat, said valve member being adapted to sequentially contact said seats, substantially as described.

7. In a fluid controller, the combination of a casing providing a rigid conduit for cold water, a second conduit for hot fluid disposed internally of the rigid conduit, said second conduit being adapted to longitudinally collapse, seats being provided at the terminal points of the rigid and collapsible conduits, the seat for the collapsible conduit normally projecting beyond the other seat, and a thermostatically controlled valve adapted to contact said seats sequentially, first to close the hot fluid inlet and thereafter to close the cold water inlet, substantially as described.

8. In a device of the class described, the combination of a casing having a pair of concentrically arranged conduits which terminate in seats, said seats being normally in non-aligned relation, means associated with one of said conduits permitting the telescoping thereof and the movement of the corresponding seat into line with the other seat, and a valve member adapted to sequentially cooperate with said seats, substantially as described.

9. In a device of the class described, the combination of a casing providing a pair of conduits, seats at the terminal points of said conduits, one conduit being adapted to contain hot and the other cold fluid, the conduit adapted to contain hot fluid being constructed to permit longitudinal contraction and expansion, the normal position of the seat at the terminal portion of said conduit projecting beyond the seat surrounding the other conduit, and a valve member adapted to be moved to cooperate, first with the seat at the terminal portion of the hot water conduit and by further movement to longitudinally contract said conduit so as to finally cause the cooperation of the valve member with the other seat, substantially as described.

Signed at Chicago, Ill., this 10th day of June, 1919.

FRED W. POWERS.

Witness:
H. E. RIGGS.